US012131330B1

United States Patent
Ben Nun et al.

(10) Patent No.: US 12,131,330 B1
(45) Date of Patent: Oct. 29, 2024

(54) FRAUD DETECTION SYSTEMS AND METHODS

(71) Applicant: Trustmi Network Ltd., Tel Aviv-Jaffa (IL)

(72) Inventors: Eli Ben Nun, Kfar Saba (IL); Shai Gabay, Pardes Hanna-Karkur (IL)

(73) Assignee: Trustmi Network Ltd., Tel Aviv-Jaffa (IL)

( * ) Notice: Subject to any disclaimer, the term of this patent is extended or adjusted under 35 U.S.C. 154(b) by 0 days.

(21) Appl. No.: 18/229,621

(22) Filed: Aug. 2, 2023

(51) Int. Cl.
*G06Q 20/40* (2012.01)

(52) U.S. Cl.
CPC ... *G06Q 20/4016* (2013.01); *G06Q 20/40145* (2013.01)

(58) Field of Classification Search
CPC .................... G06Q 20/4016; G06Q 20/40145
See application file for complete search history.

(56) References Cited

U.S. PATENT DOCUMENTS

| | | | | |
|---|---|---|---|---|
| 10,628,421 | B2 * | 4/2020 | Devarao | G06F 16/212 |
| 2018/0203922 | A1 * | 7/2018 | Erpenbach | G06F 16/3334 |
| 2019/0259033 | A1 * | 8/2019 | Reddy | G06N 5/02 |
| 2020/0120127 | A1 * | 4/2020 | Tyers | H04L 63/0236 |
| 2023/0033054 | A1 * | 2/2023 | Schlueter | H04L 9/3247 |

OTHER PUBLICATIONS

Github.com [online], "LayoutLMv2 (Document Foundation Model)," May 10, 2021, retrieved on Oct. 17, 2023, retrieved from URL<https://github.com/microsoft/unilm/tree/master/layoutlmv2>, 3 pages.
Huggingface.co [online], "The AI community building the future.," Dec. 16, 2021, retrieved on Oct. 17, 2023, retrieved from URL<https://huggingface.co/docs/transformers/model_doc/layoutlmv2>, 26 pages.
Paperswithcode.com [online], "LayoutLMv2," Jun. 22, 2018, retrieved on Oct. 17, 2023, retrieved from URL<https://paperswithcode.com/method/layoutlmv2>, 5 pages.
Ubiai.tools [online], "The Best Text Annotation Tool: UBIAI for Effortless Data Labeling!" Apr. 24, 2020, retrieved on Oct. 17, 2023, retrieved from URL<https://ubiai.tools/>, 12 pages.
Xu et al., "LayoutLMv2: Multi-modal Pre-training for Visually-rich Document Understanding," Cs.CL, Submitted on Jan. 10, 2022, arXiv:2012.14740, 13 pages.

* cited by examiner

*Primary Examiner* — Anhtai V Tran
*Assistant Examiner* — Ken Hoang
(74) *Attorney, Agent, or Firm* — Fish & Richardson P.C.

(57) ABSTRACT

Methods and systems, including computer programs encoded on computer storage media, for detecting fraudulent or suspicious transactions, e.g., in a business-to-business context. One of the methods includes: receiving, at an ingestion engine, raw data from a plurality of heterogeneous data sources; using the ingestion engine to produce structured object data, the structured object data derived from the raw data; applying a classification service to produce a partial fingerprint from the structured object data wherein the partial fingerprint classifies the structured object data; applying a fingerprinting process to the partial fingerprint to produce a full fingerprint for the structured object data; applying an enrichment engine to add data to the full fingerprint to produce an enriched fingerprint for the structured object data; and applying a verdict engine to determine a verdict on the object based at least in part on the enriched fingerprint for the structured object data.

20 Claims, 12 Drawing Sheets

Trustmi — Payments

Dave Gahan | System Health

Global A Trader #6651487 — Risky

| Total Payments Amount $5.3 B | | Total Payments 478,464 | | | Top 3 Payments Locations — USA 1.7B / UK 904M / China 766M | | New Vendors with first payment — 456 / 176,224 New Vendors (3%) | |
|---|---|---|---|---|---|---|---|---|
| Origin | Created | Vendor | Entity | Invoice Date | Amount | Country | | Trust Score |
| ♀ | 22 Nov, 2022 1:13 PM | Samsung SDI | Core Inc. | 29 Nov, 2022 2:33 PM | $2,943,664 | S.Korea | | Trusted |
| ✉ | 18 Nov, 2022 1:15 PM | Envoy Inc. | Core Inc. | 26 Nov, 2022 1:15 PM ⑬ | $4,081,820 | USA | | Trusted |
| 🗋 | 3 Nov, 2022 10:22 AM | Schneider | Core Inc. | 22 Nov, 2022 9:26 AM ② | $3,352,200 | Taiwan | | Trusted |
| ♀ | 7 Nov, 2022 9:50 AM | Texas Instruments Inc. | Core Inc. | 20 Nov, 2022 10:20 AM | $3,618,858 | USA | | Trusted |
| ✉ | 17 Nov, 2022 2:21 PM | Tuco Energie | Core Inc. | 19 Nov, 2022 4:30 PM | $985,687 | France | | Suspicious |
| ✉ | 12 Nov, 2022 1:37 PM | Powersim Inc. | Core Inc. | 19 Nov, 2022 12:55 PM ③ | $3,791,031 | France | | Trusted |
| ♀ | 15 Nov, 2022 1:20 PM | TSMC | Core Inc. | 17 Nov, 2022 3:40 PM | $375,422 | USA | | Trusted |
| ♀ | 8 Nov, 2022 12:54 PM | SeCos Corporation | Core Inc. | 11 Nov, 2022 2:45 PM | $2,923,847 | China | | Trusted |
| ♀ | 1 Nov, 2022 11:59 AM | Global A Trader | Core Inc. | 8 Nov, 2022 11:13 AM ④ | $2,242,745 | Turkey | | Risky |
| ♀ | 20 Oct, 2022 10:30 AM | 3Well Technology | Core Inc. | 5 Nov, 2022 8:30 AM | $249,419 | China | | Trusted |
| ♀ | 28 Oct, 2022 | Anligic Infotech | Core Inc. | 2 Nov, 2022 | $2,847,939 | China | | Trusted |

Transaction Fingerprint

Amount: $2,178,231
Origin: Email
Action: Creation
Sent by: dan@globalatrader.com
10-12-22, 1:30 PM
10-12-22, 1:30 PM ⚠ Transaction Fingerprint Violation From:
Trustco.inc
Bank: Bank of America
Account number: 1235-665-55422
Branch: CITICNSXGZB
12 Avenue
Pu Dong New District
USA
211418

To:
Global A Trader
Bank: Central Bank Turkey
Account number: 3332341233
Swift: SVBKUS6S
Branch: CBRTUS421
3003 Tashama square,
1123345 Instanbul

Vendor Fingerprint

Payments Fingerprint

| Trustmi | | | | | | | | | @ Dave Gahan ˅ | System Health |
|---|---|---|---|---|---|---|---|---|---|---|
| Payments | | | | | | | | | × Global ATrader #66512487 | ⦁ Risky |

Q Search Payments | ˅ Add Filter | November 1-30, 2022 ×

Total Payments Amount $5.3 B | Total Payments 478,464 | Top 3 Payments Locations | New Vendors with first payment 456 / 176,224 New Vendors (3%)

■ USA 1.7B
■ UK 994M
■ China 766M

| 📄 Transaction Fingerprint | ⦁ ˅ |
|---|---|
| 🗂 Vendor Fingerprint | ⦁ ˅ |
| 💲 Payments Fingerprint | ⦁ ˅ |

🏦 Bank  Central Bank Turkey ⦁
Beneficiary name  Global ATrader ⦁
Account number  3332341233 ⦁
Swift  SVBKUS6S ⦁
Address  3003 Tashama square, 1123345 Instanbul
Country:  ⦁ Turkey

[ ⦁ Suspicious Bank Change ˅ ] — 730

| Origin | Created | Vendor | Entity | Invoice Date | Amount | Country | Trust Score |
|---|---|---|---|---|---|---|---|
| A | 22 Nov, 2022 1:13 PM | Samsung SDI | Core Inc. | 29 Nov, 2022 2:33 PM | $2,943,664 | S.Korea | ⦁ Trusted |
| ✉ | 18 Nov, 2022 1:15 PM | Envoy Inc. | Core Inc. | 26 Nov, 2022 1:15 PM | $4,081,820 | USA | ⦁ Trusted |
| 🗎 | 3 Nov, 2022 10:22 AM | Schneider | Core Inc. | 22 Nov, 2022 9:26 AM | $3,352,200 | Taiwan | ⦁ Trusted |
| A | 7 Nov, 2022 9:50 AM | Texas Instruments Inc. | Core Inc. | 20 Nov, 2022 10:20 AM | $3,618,858 | USA | ⦁ Trusted |
| ✉ | 17 Nov, 2022 2:21 PM | Tuco Energie | Core Inc. | 19 Nov, 2022 4:30 PM | $985,687 | France | ⦁ Suspicious |
| ✉ | 12 Nov, 2022 1:37 PM | Powersim Inc. | Core Inc. | 19 Nov, 2022 12:55 PM | $3,791,031 | France | ⦁ Trusted |
| A | 15 Nov, 2022 1:20 PM | TSMC | Core Inc. | 17 Nov, 2022 3:40 PM | $375,422 | USA | ⦁ Trusted |
| A | 8 Nov, 2022 12:54 PM | SeCos Corporation | Core Inc. | 11 Nov, 2022 2:45 PM | $2,923,847 | China | ⦁ Trusted |
| A | 1 Nov, 2022 11:59 AM | Global ATrader | Core Inc. | 8 Nov, 2022 11:13 AM | $2,242,745 | Turkey | ⦁ Risky |
| A | 20 Oct, 2022 10:30 AM | 3Well Technology | Core Inc. | 5 Nov, 2022 8:30 AM | $249,419 | China | ⦁ Trusted |
| A | 28 Oct, 2022 | Anligic Infotech | Core Inc. | 2 Nov, 2022 | $2,847,939 | China | ⦁ Trusted |

| 👣 Payments Behavior | ⦁ ˅ |
|---|---|
| ✉ Email Analysis | ⦁ ˅ |
| 📄 File Analysis | ⦁ ˅ |
| ↻ History Activities | ⦁ ˅ |

FRAUD DETECTION SYSTEMS AND METHODS

BACKGROUND

Technical Field

This specification relates to software applications and services. More specifically, this specification relates to systems and methods for detecting fraudulent or suspicious transactions, e.g., in a business-to-business context.

Background

Organizations receive an increasing amount of data from a growing number of different entities. Without a convenient way to verify the validity of received data, organizations are vulnerable to all types of internal and external attacks. Furthermore, organizations lack an effective solution to detect fraud or suspicious activity across separate interactions with a specific entity. Attackers may therefore advance their attack through multiple interactions with an organization. Through such interactions, an attacker may target any step in a transaction process, such as compromising an organization's payment process flow and diverting funds into a fraudulent account sometimes referred to as business-to-business (B2B) payment fraud. As a result, it is estimated that in 2020, nine out of every ten US companies with revenue of 1 billion dollars were impacted by payment fraud.

However, many organizations have grown increasingly reliant on their existing solution for processing the ever-growing data flow from a multitude of different entities. To completely replace an organization's existing solution with a new framework of fraud detection processes and controls is burdensome. Consequently, there exists a need for a technology that can detect and prevent fraud or suspicious activity without requiring an organization to replace its existing data processing framework.

SUMMARY

This specification describes technologies for detecting fraud or suspicious activity, e.g., in a B2B context. These technologies generally involve using a cloud service to address the need in the art for a fraud detection system and method that can be adopted by organizations such that they can continue using their existing solution. Such technologies may also help an organization satisfy compliance requirements by identifying past events with a specified entity and quantifying risk of fraud associated with that entity. These technologies generally ingest raw data that the organization receives and determine the validity of the processed raw data. Such technologies moreover can correlate the validity of different pieces of data received from the same entity.

In general, one innovative aspect of the subject matter described in this specification can be embodied in methods that include the actions of receiving, at an ingestion engine, raw data from a plurality of heterogeneous data sources; using the ingestion engine to produce structured object data for an object, the structured object data derived from the raw data; applying a classification service to produce a partial fingerprint from the structured object data wherein the partial fingerprint classifies the structured object data; applying a fingerprinting process to the partial fingerprint to produce a full fingerprint for the structured object data; applying an enrichment engine to add data to the full fingerprint to produce an enriched fingerprint for the structured object data; and applying a verdict engine to determine a verdict on the object based at least in part on the enriched fingerprint for the structured object data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Applying the verdict engine can include accessing a customer baseline as part of determining a verdict on the object. Applying the classification service can include applying an initial filter to filter out data that is not relevant to constructing a fingerprint for structured object data. Applying the classification service to produce a partial fingerprint from the structured object data can include applying a machine learning process to the structured object data. Applying the fingerprinting process can include applying a natural language processing engine to characterize the structured object data. Applying the fingerprinting process can include applying a layout engine to the structured object data to determine a layout of the structured object data. Applying the fingerprinting process can include applying a machine learning process that takes the structured object data as at least one input to provide at least a portion of the full fingerprint. Applying a fingerprinting process can include providing a version of the full fingerprint to a trust network engine. Applying a fingerprinting process can include applying a fingerprinting process to structured object data for a plurality of objects describing interactions with a specified entity and applying a fingerprinting process which can include: applying an analysis engine to structured object data for each of the plurality of objects to produce a plurality of fingerprints, each of the plurality of fingerprints corresponding to one of the plurality of objects and wherein the method can further include: applying a correlation engine to the plurality of fingerprints to produce a correlated fingerprint object; repeating the applying a fingerprinting process and applying a correlation engine steps over time to product a plurality correlated fingerprint objects; and applying a baseline model engine to the plurality of correlated fingerprint objects to produce a baseline for an entity.

The method further can further include applying a network engine to the enriched fingerprint to determine a network score for the enriched fingerprint, the network score based at least in part on trust network data. The trust network data comprises anonymized fingerprint data for a plurality of objects. Applying an enrichment engine can include obtaining enrichment data from a trust network engine.

The subject matter described in this specification can be implemented in particular embodiments so as to realize one or more of the following advantages. Different pieces of data from the same specified entity can be correlated to create a baseline for that specified entity. Embodiments described in this specification leverage baseline cybersecurity technology and crowdsourcing across all systems, providing an end-to-end solution to a comprehensive set of B2B payment security issues. Certain embodiments have the advantage of detecting fraud that targets any step in the process of a transaction, protecting against all types of threats internal and external to the organization being protected. For data received from new data sources, certain embodiments have the advantage of comparing the data to a baseline established by crowdsourced historical data. Doing so adds a strong detection layer for detecting fraud from new data sources. An additional advantage is that a comprehensive set of historical data can be leveraged to train security engines. Certain embodiments evaluate incoming data without a training or learning period by providing an immediate risk assessment based on historical data. Furthermore, one can use certain embodiments described in this specification with an organization's current systems. In other words, an organization can detect fraud, e.g., B2B fraud, without having to replace all (or even part) of the organization's existing data processing framework.

Additional advantages include the ability to provide a simple risk score for each transaction which looks into the entire end to end payment process across multiple systems and connects and correlates all the various objects (Payment, Vendor, Invoice). Such a risk score allows a customer to make better decisions and improve the payment approval cycle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 7A-E show exemplary graphical user interfaces for one embodiment of a fraud detection system.

Like reference numbers and designations in the various drawings indicate like elements.

DETAILED DESCRIPTION

This specification describes technologies for detecting fraud or suspicious activity, e.g., in a B2B context. These technologies generally involve using a cloud service to address the need in the art for a fraud detection system and method that can be adopted by organizations such that they can continue using their existing solution. Such technologies may also help an organization satisfy compliance requirements by identifying past events with a specified entity and quantifying risk of fraud associate with that entity. These technologies generally ingest raw data that the organization receives and determine the validity of the processed raw data. Such technologies moreover can correlate the validity of different pieces of data received from the same entity.

Figure 1:
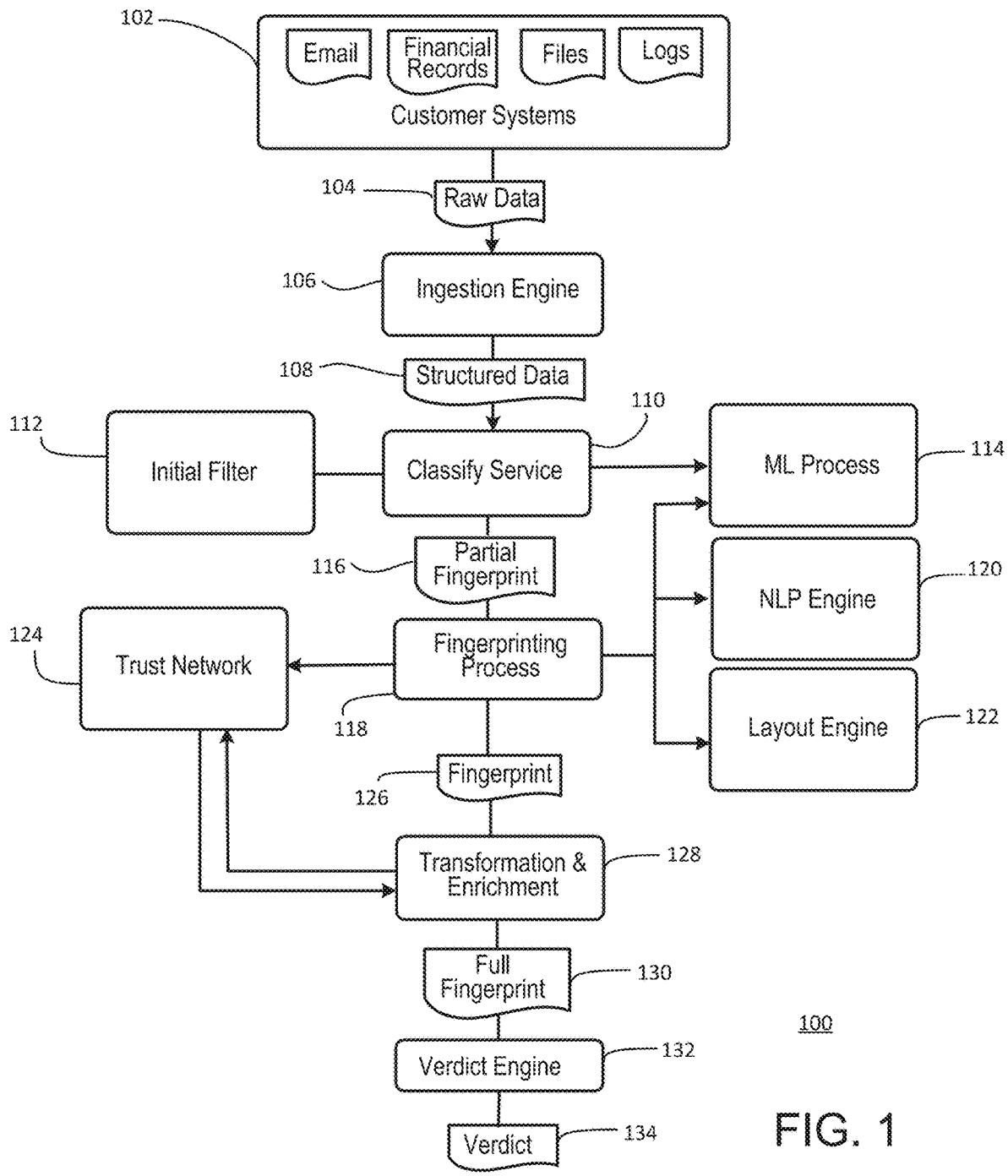
FIG. 1 is a diagram showing one example of data flow through an exemplary fraud detection system.

FIG. 1 shows a high-level data flow of a system 100 for validating raw data 104 from customer systems 102. Examples of raw data 104 include email, financial records, files, and logs. The ingestion engine 106 receives and processes the raw data 104 into structured data 108. The structured data 108 is processed by the classify service 110. In some embodiments, the classify service 110 may apply an initial filter 112 to filter out uninteresting data that is not relevant to constructing a partial fingerprint 116 for structured data 108. In identifying the type of the structured data 108 to create a partial fingerprint 116, the classify service 110 may apply a Machine Learning Process (ML) 114. The partial fingerprint 116 is analyzed through a fingerprinting process 118, which can include applying a ML process 114, a Natural Language Processing (NLP) Engine 120, and a Layout Engine 122.

In certain embodiments of system 100, the ML process 114 may be called by both the classify service 110 and the fingerprinting process 118. However, the classify service 110 and the fingerprinting process 118 can require different levels of accuracy from the ML process 114. For instance, the classify service 110 may require a lower level of accuracy than the fingerprinting process 118 does from the ML process 114 to allow the data to proceed into the next process in system 100.

In certain embodiments, NLP Engine 120 can be called by the fingerprinting process 118 to determine the content of the data by extracting the entire text of the structured data 108 to look for specific attributes, such as a bank account or an email. In certain embodiments, the Layout Engine 122 may be called by the fingerprinting process 118 to identify the structure of the data such as a document by recognizing, for instance, the position of a logo, a table, or a box of text on the data.

In certain embodiments, the ML process in general is split into steps including:
1. Defining the problem as one or more ML problems;
2. For each ML problem defining the data set and if Supervised Learning is being used, also defining the annotation schema;
3. Composing the training and evaluation data set (by selecting examples and annotating the answers for these examples);
4. Deciding on the learning algorithm and its parameters and hyper parameters;
5. Training and evaluation; and
6. Serving the model in production for inference In certain embodiments, technologies that can be used for the LayoutLM based models include LayoutLMv2, e.g., as described in LayoutLMv2: Multi-modal Pre-training for Visually-Rich Document Understanding by Yang Xu, Yiheng Xu, Tengchao Lv, Lei Cui, Furu Wei, Guoxin Wang, Yijuan Lu, Dinei Florencio, Cha Zhang, Wanxiang Che, Min Zhang, Lidong Zhou (see, e.g., arxiv.org/abs/2012.14740 and huggingface.co/docs/transformers/main/model_doc/layoutlmv2 and paperswithcode.com/method/layoutlmv2 which can use github.com/microsoft/unilm/tree/master/layoutlmv2, all retrieved on Aug. 1, 2023.

One can train the LayoutLM models using tools such as tools from UBIAI (see, e.g., ubiai.tools/retrieved on Aug. 1, 2023) UBIAI tools are tools provided by UBIAI, a company that provides cloud-based solutions and services in the field of Natural Language Processing (NLP) to help users extract actionable insights from unstructured documents. One can also use such tools for annotation of the data sets on which the system is trained and evaluated. One can also use such tools to review and validate automatically sampled annotated documents.

The system can use a variety of strategies including:
1. A rule based strategy
2. An unsupervised similarity based approach which can include generating a scoring mechanism for each payment and a scoring mechanism to represent each payment eventually as a single score.
   Then, one can calibrate thresholds for those scores to indicate when a payment is most probably benign or when a payment is anomalous or even most probably fraudulent or just a regular payment.
3. In addition or alternatively, one can use a neural network to process payments (e.g., an Autoencoder) and then extract each payment's embedding (which can be thought of as turning each payment into a vector of numbers representing the essence of that payment using a fixed size array of numbers, a so-called payment2vec). Then the system can use vector distance (or similarity) to score each new payment based on its distance or similarity to past payments of the same vendor-customer pair (or even just vendor) as well as distance or similarity to verified fraudulent past payments or to verified past benign payments. Alternatively, this approach can use classification methods other than nearest neighbor or clustering.

A fingerprint 126 with more attributes dissected emerges from the fingerprinting process 118. The fingerprint 126 can further undergo Transformation and Enrichment 128 by accessing the Trust Network 124 (described further below), which can enrich attributes of the fingerprint 126 with information from external sources to create an enriched fingerprint 130. The Verdict Engine 132 determines the validity of the raw data 104 based on the enriched fingerprint 130, resulting in a verdict 134.

Figure 2:
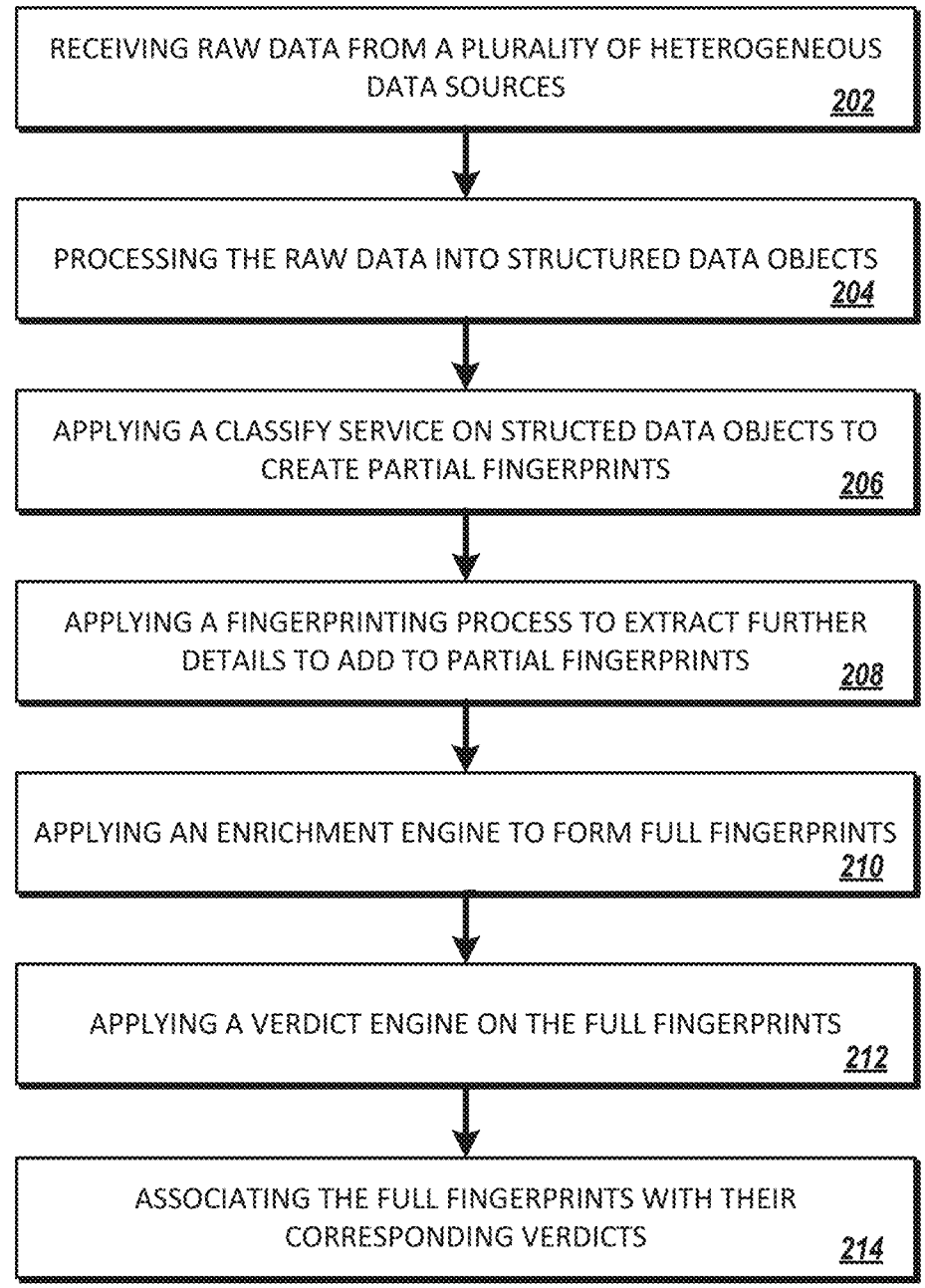
FIG. 2 is a flow chart showing an exemplary fraud detection process.

FIG. 2 is a flowchart of an example process 200 for determining the validity of raw data from a plurality of heterogeneous data sources. For convenience, the process 200 will be described as being performed by a system of one or more computers, located in one or more locations, and programmed appropriately in accordance with this specification. For example, a fraud prevention system, e.g., the high-level data flow system 100 of FIG. 1, appropriately programmed, can perform the process 200. The process 200 is an embodiment of a method comprising in consecutive order the step 202 of receiving raw data from a plurality of heterogeneous data sources, the step 204 of processing the raw data into structured data objects, the step 206 of applying a classify service on structured data objects for determining the type of structured data objects to produce partial fingerprints. The process 200 additionally comprises the step 208 of applying a fingerprinting process to extract from the structured data objects further details that are added to the partial fingerprints and the step 210 of applying an enrichment engine to form an enriched fingerprint. The process 200 further comprises the step of 212 of applying a Verdict Engine on the enriched fingerprint and the step of 214 of labeling the enriched fingerprint with a verdict. In certain embodiments, the verdict can be applied to the full fingerprint without the full fingerprint having been enriched.

Figure 3:
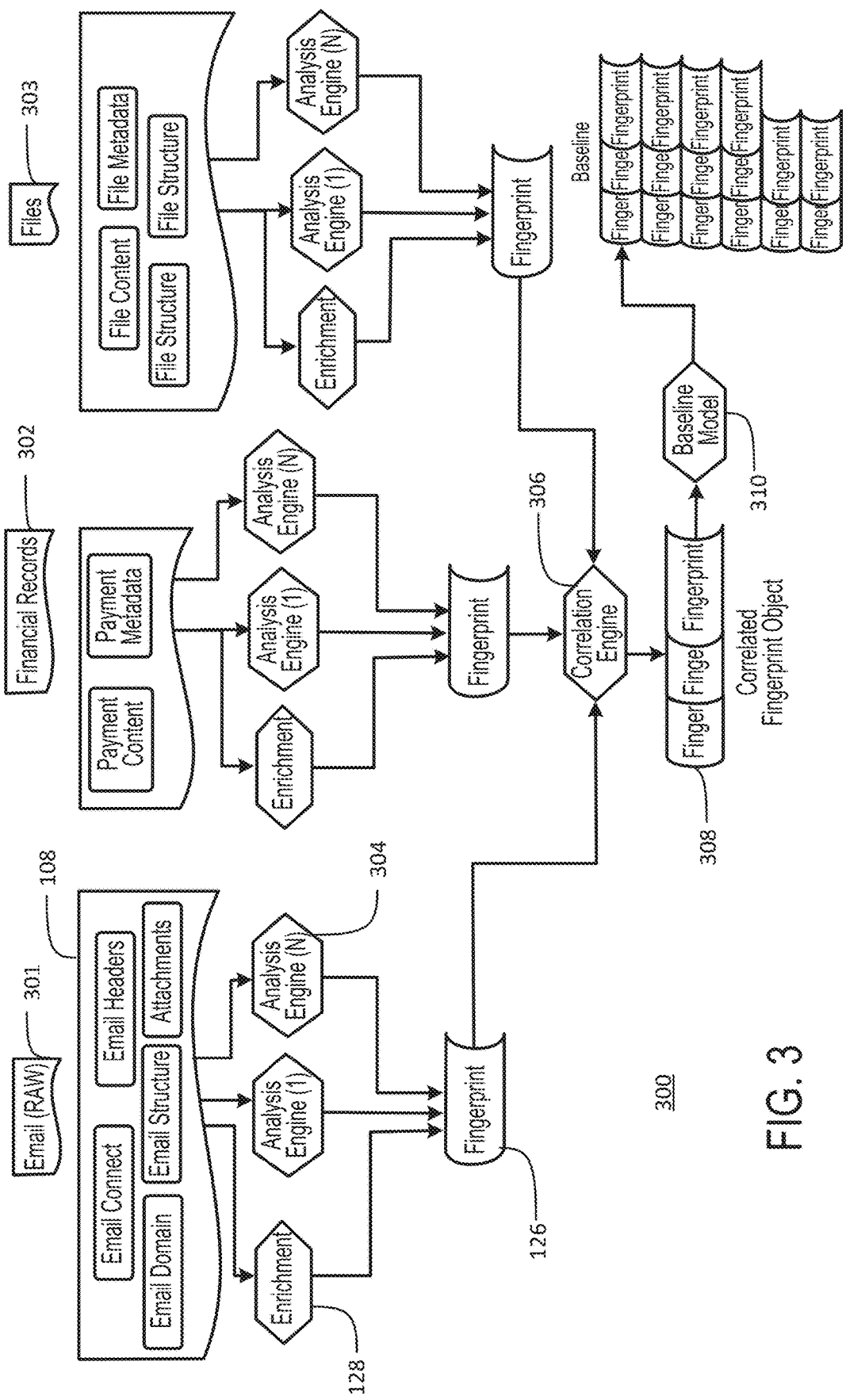
FIG. 3 is a diagram showing one example of fingerprint correlation and baseline model creation.

FIG. 3 shows a system 300 for high-level object creation of a baseline. The system 300 receives raw data 104 such as email 301, financial records 302, and files 303 from at least one source. The system can connect to several sources (e.g., email, enterprise resource planning, and procurement system(s)). In terms of records processed, depending on scale of the company, the system can ingest more than a 1000 emails per day or more than a million emails per month and/or more than 200K+ invoices, 100K+ financial transaction per week.

The raw data 104 is processed into structured data 108, upon which at least one Analysis Engine 304 is applied to create a fingerprint 126. Multiple Analysis Engines 304 and Enrichment 128 may be applied to the structured data 108 in creating a fingerprint 126. All fingerprints 126 created by the system 300 pass through a Correlation Engine 306, which can correlate fingerprint objects of a same specified entity to produce a correlated fingerprint object. A baseline model 310 creates a baseline, e.g., for a specified entity, from the correlated fingerprint objects 308. When the baseline comprises a multitude of correlated fingerprint objects 308, the system can compare data purportedly received from the specified entity to historical data from the same entity.

Figure 4:
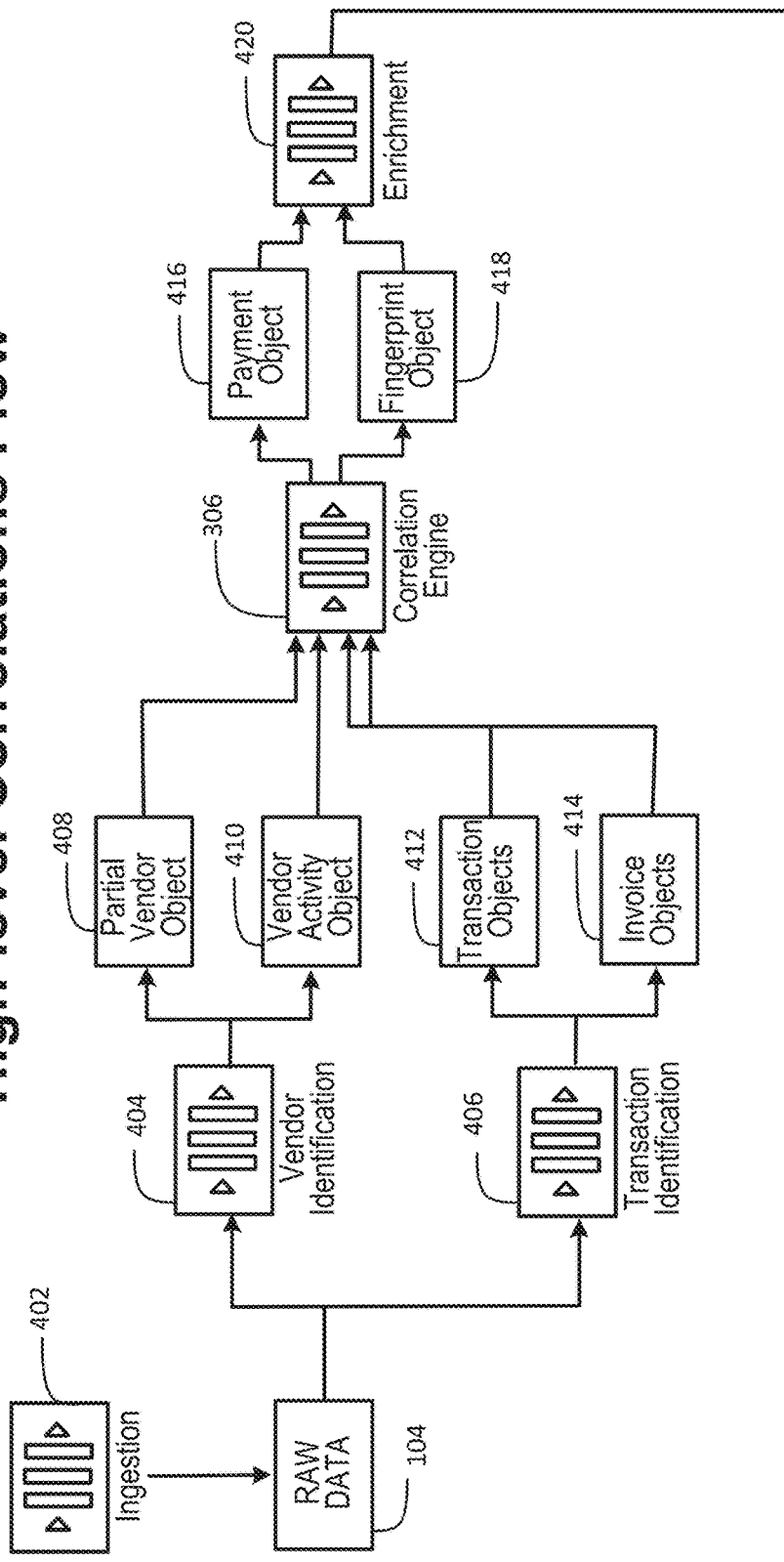
FIG. 4 is a diagram showing one example of a correlations flow according to one embodiment of a fraud detection system.
Figure 4:
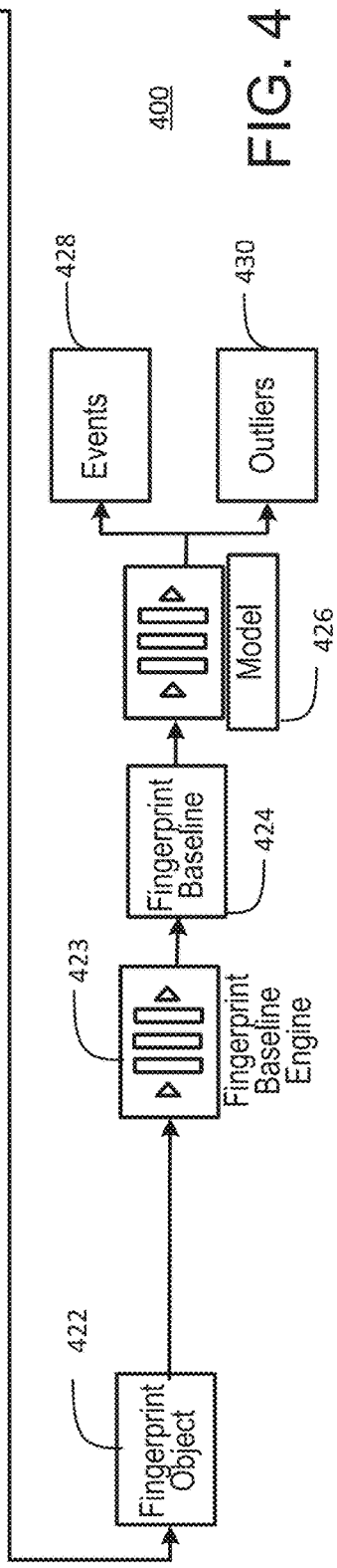

FIG. 4 shows a high-level correlations flow of a system 400. In particular, FIG. 4 shows how objects are transformed. After ingestion 402 of raw data 104, the system 400 can perform both vendor identification 404 and transaction identification 406. Vendor identification 404 creates a partial vendor object 408 and a vendor activity object 410. Similarly, transaction identification 406 creates transaction objects 412 and invoice objects 414. Vendor identification engine 404 receives raw data that represents a vendor. Vendor Identification engine then compares the data to known vendors looking for similar fingerprints and patterns to identify if raw data is from a known vendor (a match leads to a specific logic loop within the system). Transaction Identification engine 406 identifies the transaction type and what it means in this initial stage and identifies if the system has ingested a similar transaction within the customer baseline (such an identification can also effect some of the logic loops).

Correlation engine 306 a maps various fingerprints together to create a rich object the system can reference regarding a vendor/payment and identify risk 426—Once the system has created the enriched and structured objects, the system can run them against a model to analyze the objects. For example, how similar are the objects to a previously known object in the customer history, how similar are the objects to patterns of good transactions, how similar are the objects to patterns of attacks/bad transactions; are the objects unique and if so how unique, e.g., based on a score. These questions generate outliers and events, which the system can characterize as "alerts."

The correlation engine 306 creates payment objects 416 and at least one fingerprint object 418. In certain embodiments, the main technology used for the correlation engine is several matching algorithms and a graph database. Certain embodiments utilize a 2, or a 2+, step process:

Step 1—The system runs several matching algorithms which are looking for patterns & similarities in different types of objects to identify a connecting thread (the system can leverage the result of NLP & a regular expression tester (Regex) extraction in prior stages). These algorithms return a list of connected objects as "Suggested Relationship"

Step 2—For example, in certain embodiments if the system identified a common Vendor Name which exists in multiple objects (e.g., in financial records, payment file, invoice, purchase order, and/or bank statement) all of the objects will be considered related and will be loaded as an object in a graph database.

STEP 2.1—Once objects are correlated, the system can utilize a process that creates "common" relationships between the objects that reflects a business process that occurred or is in the process of being generated/paid/updated. These relationships can be complex and often lead to multiple "connections" between all the objects as a mesh that helps the system identify interesting clusters which acts as an additional "validation process" for initial match in step 1.

An example of these connections: Email object (HAS)→Invoice (Belongs to)→Vendor←(Related)→Payment (Related)→Financial Record (contains)→Financial Details (Belongs to)→Vendor Email Object (From)→Domain (Belongs To)→Vendor (Has)→Financial Details (Contains)→Financial Details←(Paid To) Payment (Related)←Invoice. Additional examples of identifiers the system can match on to create the correlated objects: Vendor name (Alias, Similarities), Vendor ID, Invoice ID (internal, External), Financial Details (e.g., IBAN, Account), Contact Details (Email, Phone, Names).

The fingerprint object 418 may be enriched into an enriched fingerprint object 422 as described above. A Fingerprint Baseline Engine 423 can create a fingerprint baseline 424. Fingerprint Baselines allow the model 426 to identify events 428 as well as outliers 430.

The model 426 may be trained on one portion of the data, and the accuracy of the model can be evaluated using another portion of the data. Successive rounds of training and evaluating may occur until the model 426 achieves a satisfactory level of accuracy.

To identify outliers 430, the model compares transaction objects 412 and/or vendor objects to the Fingerprint Baseline 424. In certain embodiments, as a last resort in the process the system can use partial fingerprints in the model, but more typically the system creates as rich of an object as practical and correlates that object with all the other objects that the system determines to be sufficiently similar and then runs the collection of correlated objects against the model 426. Methods for detecting outliers 430 can include clustering analysis, density-based outlier detection, and distance-based outlier detection.

Figure 5:
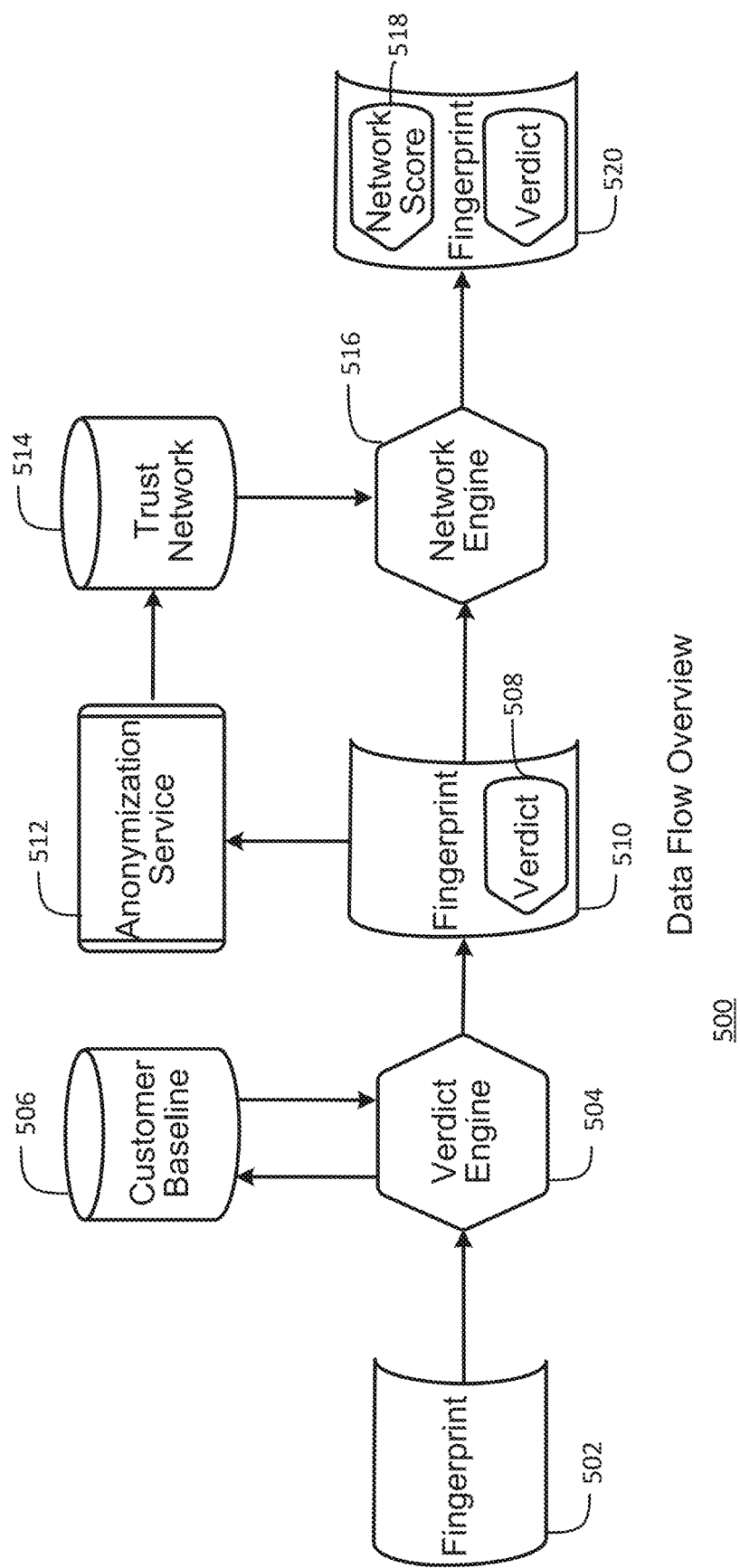
FIG. 5 is a diagram showing one embodiment of verdict engine and network engine system.

FIG. 5 is a diagram showing one embodiment of verdict engine and network engine system. FIG. 5 shows the data flow overview of a system 500. After the system 500 ingests a fingerprint 502, the Verdict Engine 504 generates a verdict 508 for the fingerprint 502. The verdict 508 can be generated through a multi-step process that is based on attributes or slices of the fingerprint, e.g., the full or enriched fingerprint. These attributes are compared to the baseline to identify either a match or an anomaly. In some embodiments, the Verdict Engine 504 accesses a customer baseline 506 in generating a verdict 508. The verdict 508 is added to the fingerprint 510.

In one embodiment, the anonymization service 512 takes the fingerprint 510 and strips it of any unique identifiers to create a new anonymized object in the Trust Network 514. The Trust Network 514 is thus a crowdsource of anonymized objects from users of the system 500. To preserve the integrity of the Trust Network 514, the fingerprint 510 must obtain a verdict 508 before it can be anonymized and added to the Trust Network 514.

In one embodiment, the Network Engine 516 can perform a lookup against the Trust Network 514 to add a network score 518 to the fingerprint 520. The network score 518 may also be anonymized and serve as a reference for the validity of the fingerprint 502. For instance, when the user receives an invoice from a new vendor that has no baseline available in the customer baseline 506 for the Verdict Engine 504 to check, the Trust Network 514 can inform whether other users have trusted the vendor.

Figure 6:
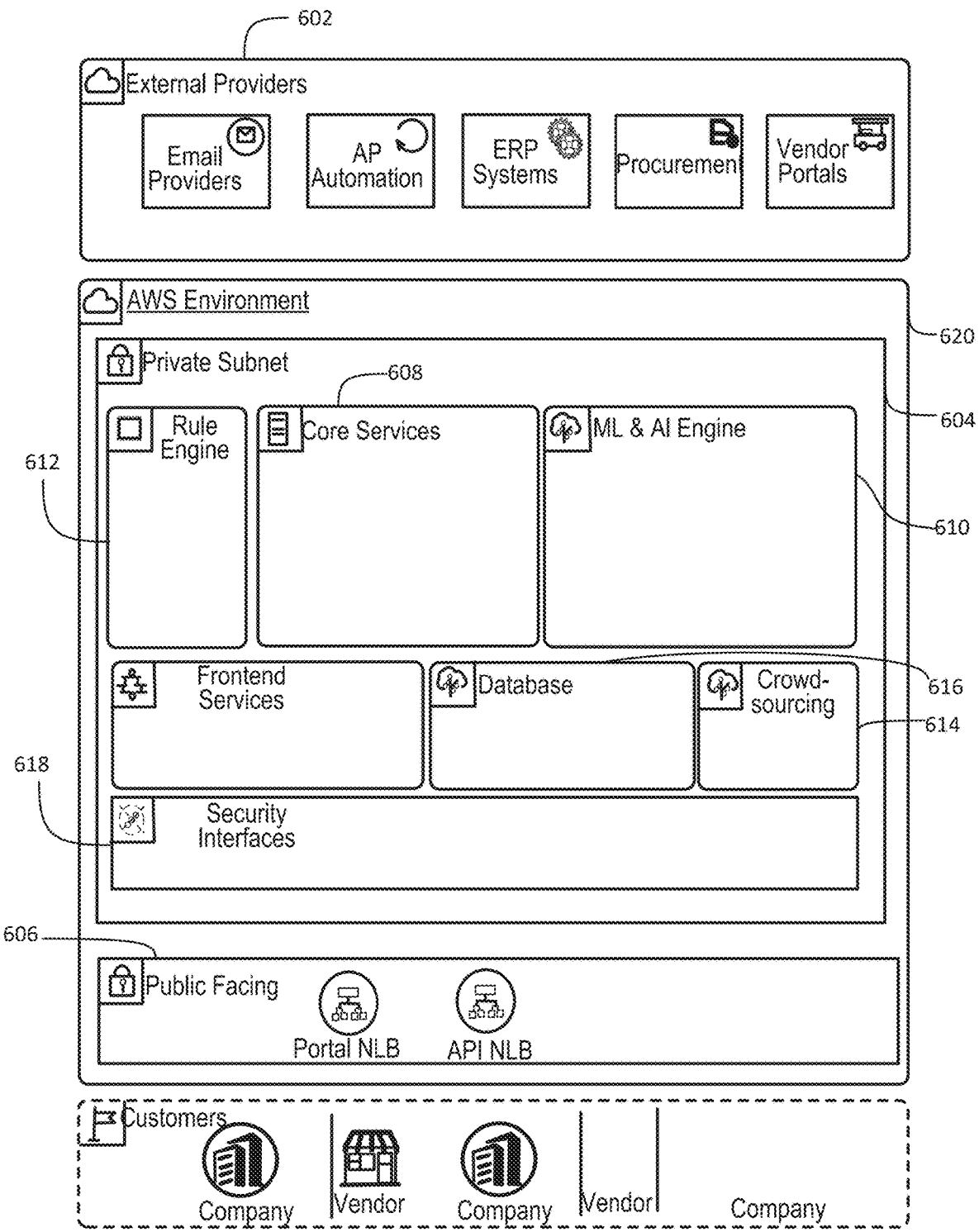
FIG. 6 is one embodiment of high-level architecture for a fraud detection system.

FIG. 6 shows the high-level architecture of a system 600. External providers 602 correspond to customer systems 102 that provide the raw data for the system 600 to process. External providers 602 may include Email Providers, AP Automation, ERP Systems, Procurement, and Vendor Portals. The raw data from the external providers 602 are ingested through Public Facing 606 interfaces of a cloud provider that provides a web services environment, e.g., an AWS Environment, 620. The web-services environment 620 can include a Private Subnet 604, which may include components such as Security Interfaces 618, Core Services 608, ML & AI Engine 610, Database 616, Crowdsourcing 614, Rule Engine 612, and Frontend Services. Once data is ingested, data first proceeds through the Security Interfaces 618 before it is processed by other components within the Private Subnet 604.

The Core Services 608 is a structure that may serve as a representation of a managed service, e.g., the Elastic Kubernetes Service. Core Services 608 encompasses the Classify Service 110, the Fingerprinting Process 118, and Transformation and Enrichment 128.

The ML & AI Engine 610 include the engines that can be called by Core Services 608 to analyze objects. Examples of engines are the ML Process 114, the NLP Engine 120, and the Layout Engine 122.

The database 616 and crowdsourcing 614 provide separate structures for keeping historical data. Historical data in records of a user or customer, for instance the customer baseline 506, are maintained in the database 616. Historical data that are contributed by the user or customer to the trust network 514 are maintained in crowdsourcing 614. The system 600 therefore ensures that if a user or customer's database 616 is corrupted, at least the crowdsourcing 614 that protects the trust network 514 will not be affected.

The system 600 may preserve the integrity of the trust network 514 through other mechanisms, such as ensuring that the same piece of data is only submitted once to the trust network 514 or that the data to be added to the trust network 514 is processed in a stream-like manner. Data submitted to the trust network 514, therefore, can only affect the analysis of future, but not past, transactions.

The Rule Engine 612 corresponds to the Verdict Engine 132. The Rule Engine 612 is a structure for at least one Analysis Engine 304 and one Correlation Engine 306. In certain embodiments, the Rule Engine 612 may contain multiple Analysis Engines 304 and Correlation Engines 306.

Figure 7A:
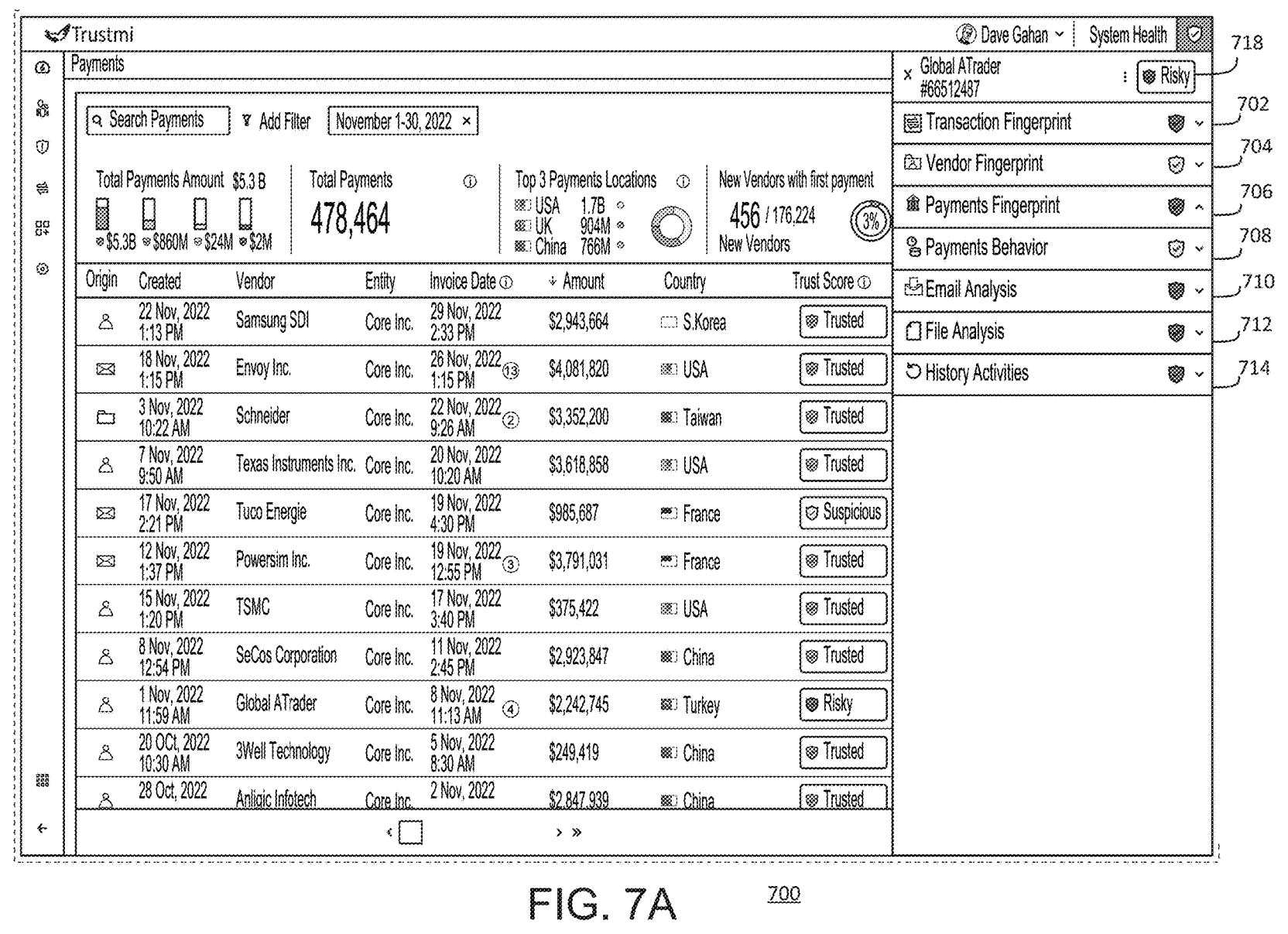

FIG. 7A shows an exemplary graphical user interface 700 for payments of an embodiment of a fraud detection system. This example embodiment shows that for each selected specified entity, such as a vendor, the graphical user interface 700 may include components such as the vendor's Transaction fingerprint 702, Vendor Fingerprint 704, Payments Fingerprint 706, Payments Behavior 708, Email Analysis 710, File Analysis 712, and History Activities 714. These components can impact an individual verdict 716. The overall trust score 718 for the vendor is derived from the sum of each component's verdict 716 and the correlated network score 518. In terms of the verdict score, the system can use a weighting approach to compute based on a set of indicators. For example, if the payment fingerprint is changed and a single other engine/analysis returns "yellow" or "red" then the total score can be red and risky (so the weight of the payment fingerprint is very high). Alternatively, if four engines such as email analysis, file analysis, payment behavior, and the vendor fingerprint are "yellow"/ "red" but the payment fingerprint is green, then the overall score can be "yellow" but not red.

Thus, the system can for instance detect fraud or suspicious activity based on the overall correlated fingerprints generated from interactions with a vendor, rather than based on just an individual fingerprint from an isolated interaction with a vendor.

FIG. 7B shows an exemplary graphical user interface for payments of one embodiment of a fraud detection system where the Transaction Fingerprint 702 is in expanded view. The Transaction Fingerprint 702 may contain data on where the payment transaction is coming from 720 and going to 722. Where the Transaction Fingerprint 702 is not associated with a trusted verdict, it may indicate details of a Transaction Fingerprint Violation 724 including a risk score. For instance, a Transaction Fingerprint Violation 724 may indicate that the transaction was sent by a look alike domain and the location of the transaction does not match the location for the specified entity retrieved from an enrichment process.

Figure 7C:
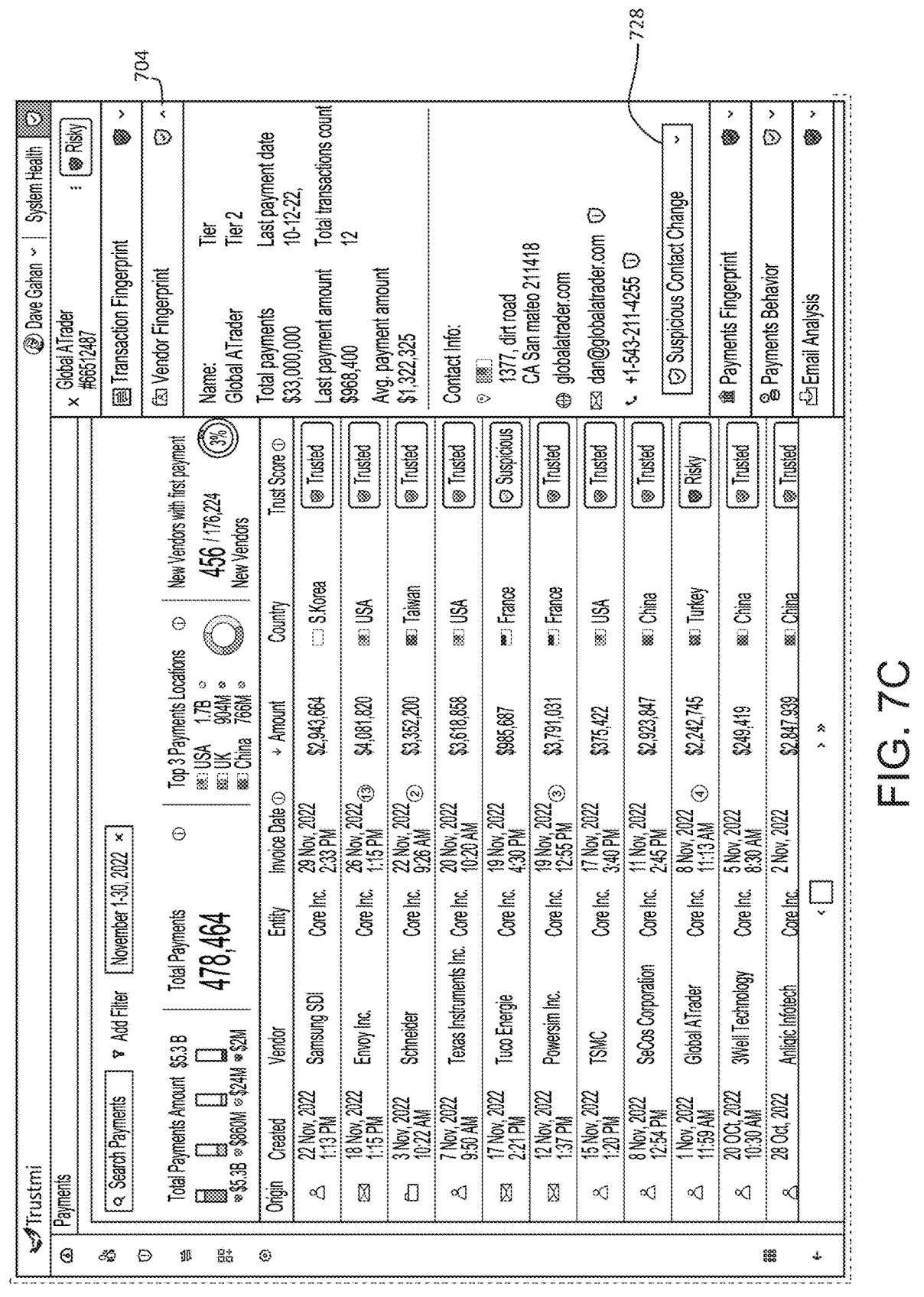

FIG. 7C shows an exemplary graphical user interface for payments of one embodiment of a fraud detection system where the Vendor Fingerprint 704 is in expanded view. The Vendor Fingerprint 704 may contain data such as the contact info or identity of the specified entity. The Vendor Fingerprint 704 may furthermore contain information about a specified entity including total payments, total transaction count, last payment amount, last payment date, and average payment amount. This information may serve as a baseline for payments to the specified entity. Where an anomaly is detected in data compared to a baseline, the Vendor Fingerprint may indicate an alert 728 that describes the anomaly, such as a suspicious contact change.

FIG. 7D shows an exemplary graphical user interface for payments of one embodiment of a fraud detection system where the Payments Fingerprint 706 is in expanded view. The Payments Fingerprint 706 may contain data on the details of the payment including the Bank, Beneficiary name, Account number, Swift, Address, and Country. Where an anomalous change is detected such data, for instance, the Payments Fingerprint may include an alert 730 that describes the anomaly, such as a suspicious bank change.

Figure 7E:
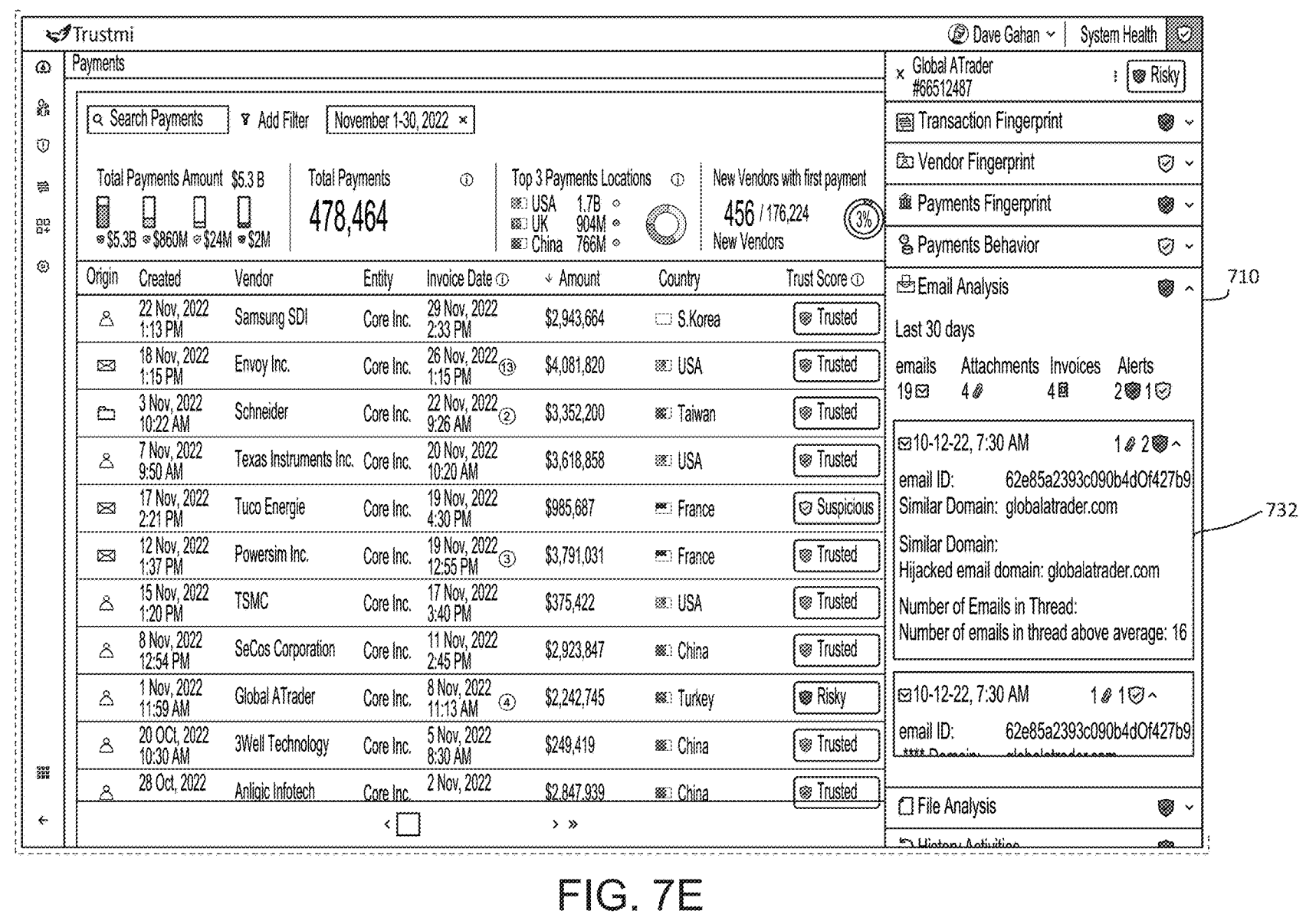

FIG. 7E shows an exemplary graphical user interface for payments of one embodiment of a fraud detection system where the Email Analysis 710 is in expanded view. The Email Analysis 710 may be done based on the number of emails within a specified timeframe. The Email Analysis 710 may further contain data on the number of attachments, invoices and alerts from the emails. A breakdown of such data may be displayed through individual description boxes 732, which may comprise a timestamp, an email ID, a similar domain, hijacked email domain, number of emails in thread, and number of emails in thread above average.

Figure 8:
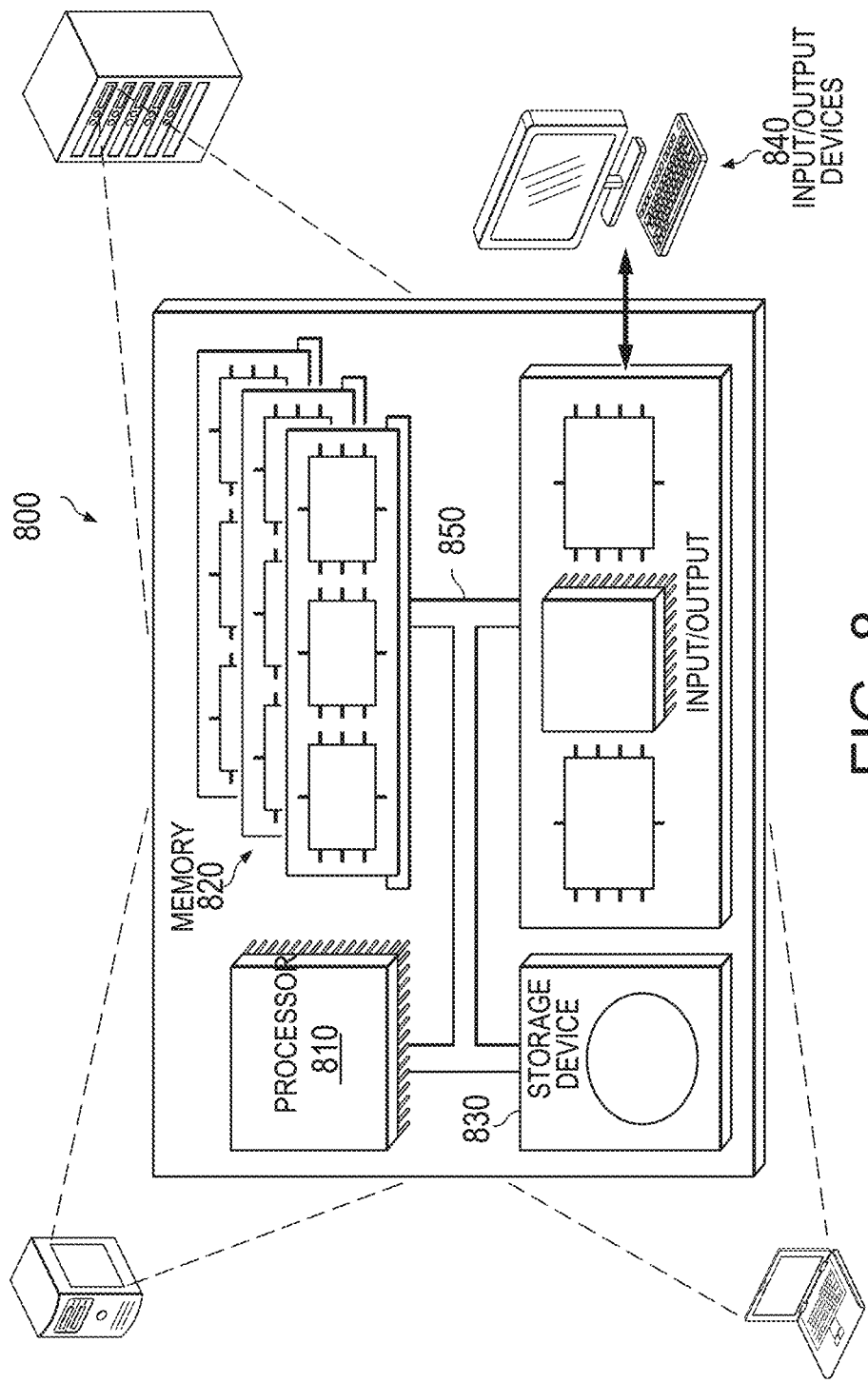
FIG. 8 illustrates a schematic diagram of an example computing system 800 that can be used for the operations described in association with the implementations described herein.

FIG. 8 illustrates a schematic diagram of an example computing system 800. The system 800 can be used for the operations described in association with the implementations described herein. For example, the system 800 may be included in the computer system discussed herein. The system 800 includes a processor 810, a memory 820, a storage device 830, and an input/output device 840. The components 810, 820, 830, and 840 are interconnected using a system bus 850. The processor 810 is capable of processing instructions for execution within the system 800. In some implementations, the processor 810 is a single-threaded processor. The processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit. The memory 820 is a non-volatile memory unit. The storage device 830 is capable of providing mass storage for the system 800. The storage device 830 is a computer-readable medium. The storage device 830 may be a floppy disk device, a hard disk device, an optical disk device, or a tape device. The input/output device 840 provides input/output operations for the system 800. The input/output device 840 includes a keyboard and/or pointing device. The input/output device 840 includes a display unit for displaying graphical user interfaces.

An electronic document, which for brevity is simply be referred to as a document, may, but need not, correspond to a file. A document may be stored in a portion of a file that holds other documents, in a single file dedicated to the document in question, or in multiple coordinated files.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software based system or subsystem that can perform one or more specific functions. Generally, an engine can be implemented as one or more software modules or components, installed on one or more computers in one or more locations. In some cases, one or more computers can be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, at an ingestion engine, raw transaction data from a plurality of heterogeneous data sources for a first user, the raw transaction data including transaction data recorded at different dates;
using the ingestion engine to produce structured object data for an object, the structured object data derived from the raw transaction data;
applying a classification service to produce a partial fingerprint from the structured object data wherein the partial fingerprint comprises a plurality of attributes and wherein the classification service applies a machine learning process to classify the structured object data based at least in part on the plurality of attributes;
applying a fingerprinting process to the partial fingerprint to produce a full fingerprint for the structured object data, the full fingerprint having financial attributes;
applying an enrichment engine to add data to the full fingerprint to produce an enriched fingerprint for the structured object data, wherein applying the enrichment engine comprises applying a network engine to the full fingerprint to determine a network score for the enriched fingerprint, the network score based at least in part on trust network data, wherein the trust network data comprises anonymized fingerprint data for a plurality of objects, the anonymized fingerprint data from a plurality of other users; and
applying a verdict engine to determine a verdict on the object based at least in part on the financial attributes of the enriched fingerprint for the structured object data.

2. The method of claim 1, wherein applying the verdict engine comprises accessing a customer baseline as part of determining a verdict on the object.

3. The method of claim 2, wherein applying the classification service comprises applying an initial filter to filter out data that is not relevant to constructing a fingerprint for structured object data.

4. The method of claim 3, wherein applying the classification service to produce a partial fingerprint from the structured object data comprises applying a machine learning process to the structured object data.

5. The method of claim 4, wherein applying the fingerprinting process comprises applying a natural language processing engine to characterize the structured object data.

6. The method of claim 5, wherein applying the fingerprinting process comprises applying a layout engine to the structured object data to determine a layout of the structured object data.

7. The method of claim 6, wherein applying the fingerprinting process comprises applying a machine learning process that takes the structured object data as at least one input to provide at least a portion of the full fingerprint.

8. The method of claim 7, wherein applying a fingerprinting process comprises providing a version of the full fingerprint to a trust network engine.

9. The method of claim 3, wherein applying a fingerprinting process comprises applying a fingerprinting process to structured object data for a plurality of objects describing interactions with a specified entity and wherein applying a fingerprinting process comprises
applying an analysis engine to structured object data for each of the plurality of objects to produce a plurality of fingerprints, each of the plurality of fingerprints corresponding to one of the plurality of objects and wherein the method further comprises:
applying a correlation engine to the plurality of fingerprints to produce a correlated fingerprint object;
repeating the applying a fingerprinting process and applying a correlation engine steps over time to produce a plurality correlated fingerprint objects; and
applying a baseline model engine to the plurality of correlated fingerprint objects to produce a baseline for an entity.

10. The method of claim 1, wherein the anonymized fingerprint data is non-hash data.

11. The method of claim 1, wherein the financial attributes comprise at least one transaction attribute, at least one vendor attribute or at least one payment attribute or a combination of at least two such attributes.

12. The method of claim 1, wherein applying an enrichment engine comprises obtaining enrichment data from a trust network engine.

13. A system comprising:
one or more computers having one or more processors and one or more storage devices on which are stored instructions that are operable, when executed by the one or more computers, to cause the one or more computers to perform operations comprising:
receiving, at an ingestion engine, raw transaction data from a plurality of heterogeneous data sources for a first user, the raw transaction data including transaction data recorded at different dates;
using the ingestion engine to produce structured object data for an object, the structured object data derived from the raw transaction data;
applying a classification service to produce a partial fingerprint from the structured object data wherein the partial fingerprint comprises a plurality of attributes and wherein the classification service applies a machine learning process to classify the structured object data based at least in part on the plurality of attributes;
applying a fingerprinting process to the partial fingerprint to produce a full fingerprint for the structured object data, the full fingerprint having financial attributes;
applying an enrichment engine to add data to the full fingerprint to produce an enriched fingerprint for the structured object data, wherein applying the enrichment engine comprises applying a network engine to the full fingerprint to determine a network score for the enriched fingerprint, the network score based at least in part on trust network data, wherein the trust network data comprises anonymized fingerprint data for a plurality of objects, the anonymized fingerprint data from a plurality of other users; and
applying a verdict engine to determine a verdict on the object based at least in part on the financial attributes of the enriched fingerprint for the structured object data.

14. The system of claim 13, wherein applying the verdict engine comprises accessing a customer baseline as part of determining a verdict on the object.

15. The system of claim 14, wherein applying the classification service comprises applying an initial filter to filter out data that is not relevant to constructing a fingerprint for structured object data.

16. The system of claim 15, wherein applying the classification service to produce a partial fingerprint from the structured object data comprises applying a machine learning process to the structured object data.

17. The system of claim 16, wherein applying the fingerprinting process comprises applying a natural language processing engine to characterize the structured object data.

18. The system of claim 17, wherein applying the fingerprinting process comprises applying a layout engine to the structured object data to determine a layout of the structured object data.

19. The system of claim 15, wherein applying a fingerprinting process comprises applying a fingerprinting process to structured object data for a plurality of objects describing interactions with a specified entity and wherein applying a fingerprinting process comprises
- applying an analysis engine to structured object data for each of the plurality of objects to produce a plurality of fingerprints, each of the plurality of fingerprints corresponding to one of the plurality of objects and wherein the method further comprises:
- applying a correlation engine to the plurality of fingerprints to produce a correlated fingerprint object;
- repeating the applying a fingerprinting process and applying a correlation engine steps over time to product a plurality correlated fingerprint objects; and
- applying a baseline model engine to the plurality of correlated fingerprint objects to produce a baseline for an entity.

20. A method comprising:
- receiving, at an ingestion engine, raw data from a plurality of heterogeneous data sources;
- using the ingestion engine to produce structured object data for an object, the structured object data derived from the raw data;
- applying a classification service to produce a partial fingerprint from the structured object data wherein the partial fingerprint classifies the structured object data, wherein applying the classification service comprises applying an initial filter to filter out data that is not relevant to constructing a fingerprint for structured object data, wherein applying the classification service to produce a partial fingerprint from the structured object data comprises applying a machine learning process to the structured object data;
- applying a fingerprinting process to the partial fingerprint to produce a full fingerprint for the structured object data, wherein applying the fingerprinting process comprises applying a natural language processing engine to characterize the structured object data, applying a layout engine to the structured object data to determine a layout of the structured object data, applying a machine learning process that takes the structured object data as at least one input to provide at least a portion of the full fingerprint, and providing a version of the full fingerprint to a trust network engine;
- applying an enrichment engine to add data to the full fingerprint to produce an enriched fingerprint for the structured object data, wherein applying the enrichment engine comprises applying a network engine to the full fingerprint to determine a network score for the enriched fingerprint, the network score based at least in part on trust network data, wherein the trust network data comprises anonymized fingerprint data for a plurality of objects, the anonymized fingerprint data from a plurality of other users; and
- applying a verdict engine to determine a verdict on the object based at least in part on the enriched fingerprint for the structured object data, wherein applying the verdict engine comprises accessing a customer baseline as part of determining a verdict on the object.

* * * * *